Figure 1:
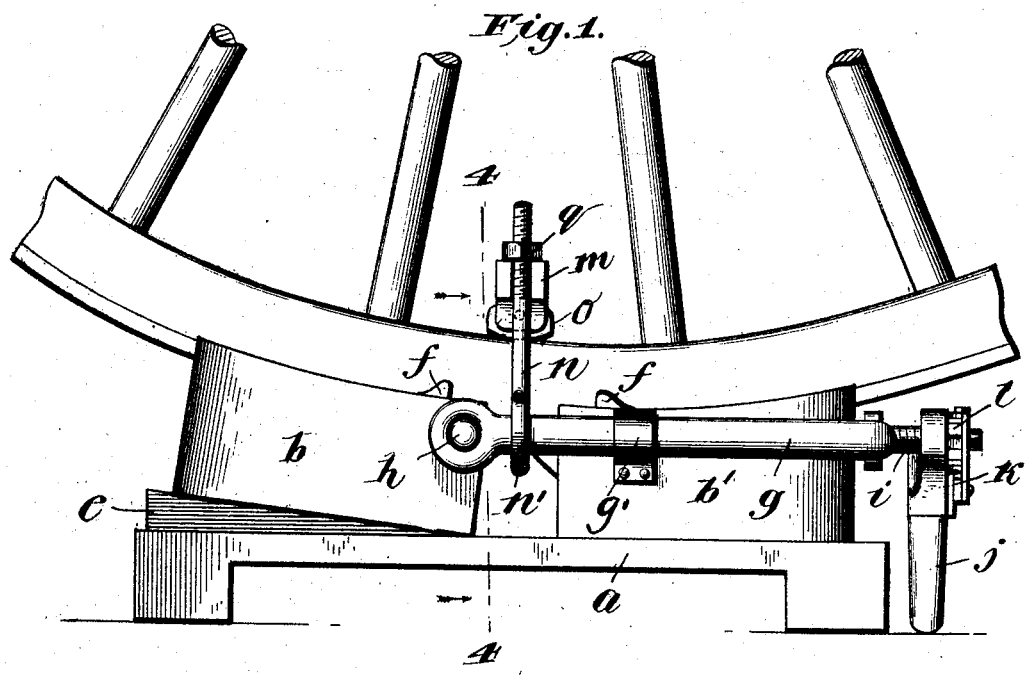

No. 780,552. PATENTED JAN. 24, 1905.
J. I. DEPEW.
TIRE UPSETTER.
APPLICATION FILED SEPT. 15, 1904.

2 SHEETS—SHEET 1.

WITNESSES:
Elmer Seavey
Nellie Yates

INVENTOR,
James I. Depew.
BY Davis & Davis,
Attorneys.

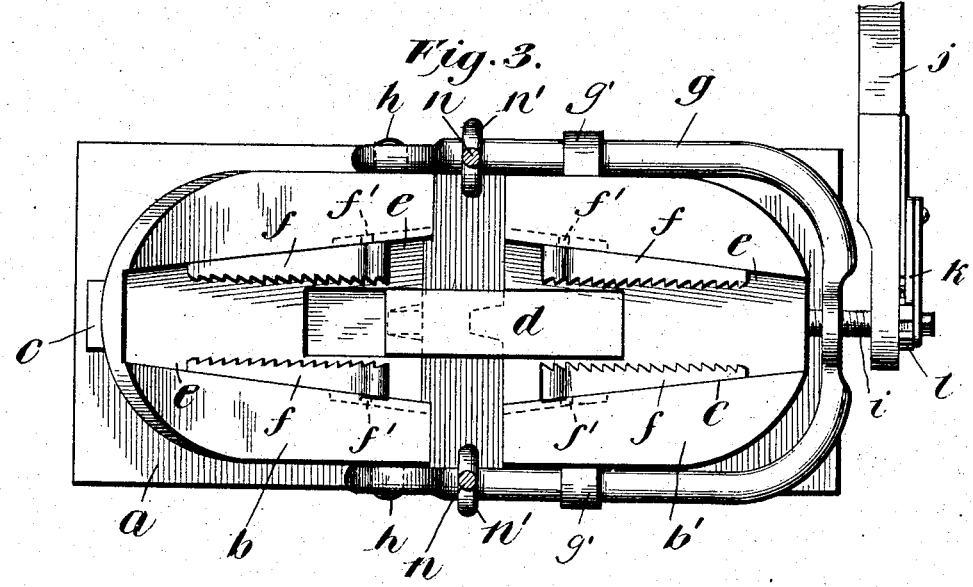
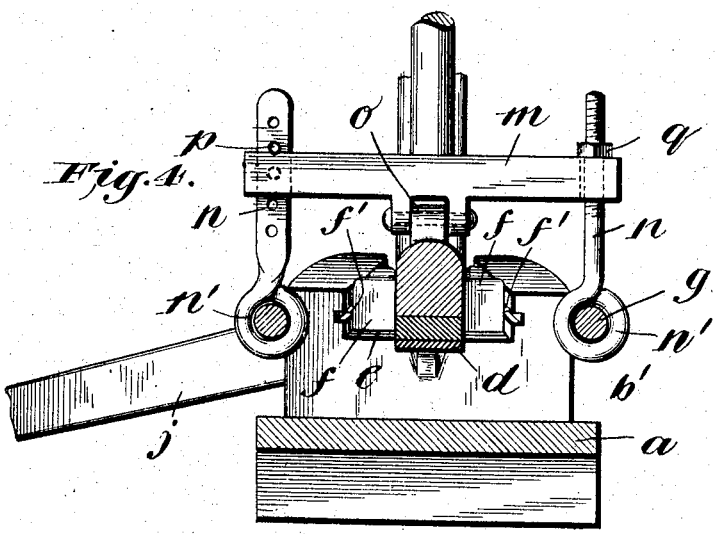

No. 780,552. Patented January 24, 1905.

UNITED STATES PATENT OFFICE.

JAMES I. DEPEW, OF LOUP, NEBRASKA.

TIRE-UPSETTER.

SPECIFICATION forming part of Letters Patent No. 780,552, dated January 24, 1905.

Application filed September 15, 1904. Serial No. 224,575.

*To all whom it may concern:*

Be it known that I, JAMES I. DEPEW, a citizen of the United States of America, and a resident of Loup, county of Sherman, State of Nebraska, have invented certain new and useful Improvements in Tire-Upsetters, of which the following is a full and clear specification.

The object of this invention is to provide a simple and very powerful apparatus for upsetting or shrinking the tire cold and without removing it from the wheel.

To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout the several views, and in which—

Figure 2:
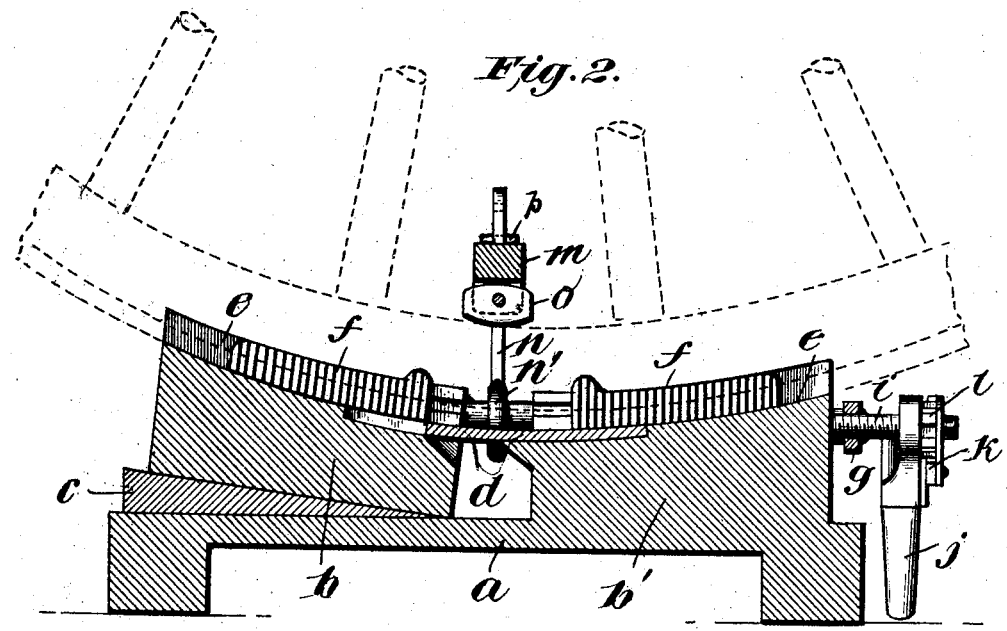

Figure 1 is a side elevation; Fig. 2, a vertical longitudinal section; Fig. 3, a plan with the wheel removed, and Fig. 4 a vertical transverse section of my preferred construction.

Referring to the drawings by reference characters, $a$ designates the base, upon which is mounted end to end a pair of similarly-shaped wheel-supporting blocks $b\ b'$, the latter being affixed to or formed integral with the base and the former being slidably mounted thereon. In the upper faces of these two blocks are formed coinciding longitudinal grooves having their bottoms curved to correspond approximately with the curvature of the average wheel. The slidable block is supported on a wedge $c$, by which it may be vertically adjusted to a limited extent to accommodate wheels of different diameters. The stationary block is provided at its inner end with a curved projecting plate $d$, which extends over upon the movable block and works in a groove formed in the bottom of the tire-receiving groove therein. This plate assists in keeping the blocks in alinement and forms a substantial support for the tire across the opening between the blocks. The upper face of this bridging-plate $d$ is flush with the curved bottom surfaces of the grooves, as shown. This bridge may be formed separately and attached to one of the blocks, or it may be formed integral therewith. The wheel-receiving grooves in each block have their side edges $e$ inclined away from each other toward the inner end of the block, and working against these inclined edges are the slidable wedge-shaped dogs $f$, whose inner faces are parallel and provided with a series of teeth which are adapted to bite into the opposite side edges of the tire. These dogs are guided and kept in position by lateral lugs $f'$, formed on their outer edges and working in grooves in the inclined walls of the grooves. To draw the movable block toward the stationary one, I employ a yoke $g$, whose ends are pivoted to the opposite sides of the movable block by trunnions $h$. This yoke embraces the stationary block, and in order to exert the required amount of power upon it I mount in the center of its arched portion a screw $i$, which is tapped through the yoke and bears upon the center of the outer end of the block $b'$. To operate this screw, I prefer employing a lever $j$, provided with a pawl $k$, adapted to engage a ratchet-wheel $l$, affixed to the screw. Suitable guides $g'$ are secured to the stationary block to guide the yoke in its reciprocatory movements. This ratchet-lever projects laterally transversely to the blocks, so that the lever will be in a convenient position for operation by the operator who stands at the side of the apparatus. By this ratchet-and-screw device I am enabled to obtain a very powerful action and apply the same gradually and without detaching the operating-lever. It will be observed that when the wheel is placed in the blocks in the manner shown and the wedge-dogs are driven outward until they bite into the tire and the screw is rotated the slidable block will be drawn with great power toward the stationary block, and thus crowd or upset the metal of the tire.

To securely hold the wheel in place while the power is applied, I employ a bar $m$, which is passed through the wheel between the spokes after the wheel is properly placed and is clamped down upon the felly by a pair of upright rods or links $n$. To prevent marring of the felly while the blocks are moved toward each other in the shrinking process, I pivot on the under side of the bar n a rocking bearing-piece o, the pivot being transversely of the felly and being mounted in a pair of lugs depending from the bar. The bearing-face of the part o is longitudinally grooved in order to fit down over the curved inner edge of the felly, and its lower edge is in addition longitudinally curved, so that as the wheel moves its bearing part will rock freely, and thereby avoid scraping or materially bruising the paint on the felly. The links n are slidingly and pivotally connected to the respective side arms of the yoke by means of an eye n' formed on the lower end of each. The upper ends of these links are each connected adjustably to the bar m, one by means of a series of holes in the link and a movable pin p and the other by a nut q. threaded on it and adapted to bear down upon the upper side of the bar m. By means of these adjustments the bar m may be adjusted to suit fellies of different thicknesses and to properly clamp the wheel in place.

It will be apparent to those skilled in the art that various mechanical embodiments of the invention are possible, and I therefore do not wish to be limited to the exact arrangement and construction shown.

What I claim, and desire to secure by Letters Patent, is—

1. In a tire-upsetter of the class described, means for holding the wheels while under operation, said means consisting of a vertical pair of links, a cross-bar connecting the upper ends of these links, a felly-bearing piece pivoted to the under side of this cross-bar, the pivot extending longitudinally of the cross-bar and transversely of the tire-supporting blocks, the under side of this felly-bearing piece being curved and grooved, for the purpose set forth.

2. In an apparatus of the class described, the combination of a base, a pair of wheel-supporting blocks carrying tire-gripping wedges, a yoke having its ends pivoted to one of the blocks and its body portion embracing the opposite block, means carried by the yoke for drawing the blocks together through the medium of the yoke, with means for holding the wheel to the blocks while under operation, said means consisting of a pair of links pivotally and slidingly connected to the arms of the yoke, a cross-bar adjustably connected to the upper ends of said links, and a rocking bearing-piece carried by said cross-bar.

3. In an apparatus of the class described, the combination of a base, a pair of wheel-supporting blocks carrying tire-gripping wedges, a yoke having its ends pivoted to one of the blocks and its body portion embracing the opposite block, a screw tapped through the center of the arch of the yoke for drawing the blocks together through the medium of the yoke, a laterally-extending operating lever and ratchet for operating said screw, with means for holding the wheel to the blocks while under operation.

4. In an apparatus of the class described, the combination of a base, a pair of wheel-supporting blocks carrying tire-gripping wedges, a yoke having its ends pivoted to one of the blocks and its body portion embracing the opposite block, means carried by the yoke for drawing the blocks together through the medium of the yoke, with means for holding the wheel to the blocks while under operation, said means consisting of a pair of links pivotally and slidingly connected to the arms of the yoke, a cross-bar carried by the links and a felly-bearing piece carried by the cross-bar.

5. In an apparatus of the class described, the combination of a base, a pair of wheel-supporting blocks carrying tire-gripping devices, and means for drawing the blocks together, said means including side arms, with upright rods or links pivotally connected to said side arms, and a cross-bar connected to the links and carrying a felly-engaging piece.

6. In an apparatus of the class described, the combination of a base, a pair of wheel-supporting blocks carrying tire-gripping wedges, a yoke having its ends pivoted to one of the blocks and its arch portion embracing the opposite block, means on this latter block for guiding the yoke-arms, a screw carried by the yoke for drawing the blocks together through the medium of the yoke, a laterally-extending ratchet-lever connected to the outer end of this screw, with means for holding the wheel to the blocks while under operation.

In testimony whereof I hereunto affix my signature, in the presence of two witnesses, this 3d day of September, 1904.

JAMES I. DEPEW.

Witnesses:
W. R. MELLOR,
JOHN W. LONG.